(12) United States Patent
Kiani et al.

(10) Patent No.: US 11,148,832 B2
(45) Date of Patent: Oct. 19, 2021

(54) SYSTEMS AND METHODS FOR VIBRATION CONTROL

(71) Applicant: Iris Technology Corporation, Irvine, CA (US)

(72) Inventors: Tal Kiani, Mission Viejo, CA (US); Edgar Moody, Hermosa Beach, CA (US)

(73) Assignee: Iris Technology Corporation, Irvine, CA (US)

(*) Notice: Subject to any disclaimer, the term of this patent is extended or adjusted under 35 U.S.C. 154(b) by 16 days.

(21) Appl. No.: 16/009,058

(22) Filed: Jun. 14, 2018

(65) Prior Publication Data

US 2018/0362192 A1   Dec. 20, 2018

Related U.S. Application Data

(60) Provisional application No. 62/521,206, filed on Jun. 16, 2017.

(51) Int. Cl.
| | |
|---|---|
| *F25B 9/14* | (2006.01) |
| *B64G 1/38* | (2006.01) |
| *F25B 25/00* | (2006.01) |
| *G02B 27/64* | (2006.01) |
| *F16F 15/02* | (2006.01) |
| *F16F 7/10* | (2006.01) |
| *F25B 49/00* | (2006.01) |
| *G03B 15/00* | (2021.01) |
| *G03B 17/56* | (2021.01) |
| *G03B 17/55* | (2021.01) |

(52) U.S. Cl.
CPC .............. *B64G 1/38* (2013.01); *F16F 7/1011* (2013.01); *F16F 15/02* (2013.01); *F25B 9/14* (2013.01); *F25B 25/005* (2013.01); *F25B 49/00* (2013.01); *G02B 27/646* (2013.01); *F25B 2500/13* (2013.01); *F25B 2500/19* (2013.01); *G03B 15/006* (2013.01); *G03B 17/55* (2013.01); *G03B 17/561* (2013.01)

(58) Field of Classification Search
CPC .................................................. F25B 2500/13
See application file for complete search history.

(56) References Cited

U.S. PATENT DOCUMENTS

| | | | | |
|---|---|---|---|---|
| 5,836,165 | A * | 11/1998 | Champion | ............... F16F 15/02 62/6 |
| 6,131,394 | A * | 10/2000 | Lavietes | ............... F04B 39/0027 62/6 |
| 6,392,397 | B1 * | 5/2002 | Thomas | ............... G01R 23/165 324/76.11 |

(Continued)

*Primary Examiner* — Filip Zec
(74) *Attorney, Agent, or Firm* — Crowell & Moring LLP

(57) ABSTRACT

A system for vibration control of a cryocooler that cools an imager. The system includes a vibration sensor that is physically affixed to the cryocooler. The vibration sensor senses a physical vibration of the cryocooler and to generates a vibration signal therefrom. The system also includes cryocooler drive electronics operatively coupled to the vibration sensor and the cryocooler. The cryocooler drive electronics output a drive waveform that drives the cryocooler so as to reduce the vibration impact of the cryocooler. The harmonic content of the cryocooler drive waveform is controlled by the cryocooler drive electronics based on the vibration signal.

7 Claims, 3 Drawing Sheets

(56) References Cited

U.S. PATENT DOCUMENTS

| | | | | |
|---|---|---|---|---|
| 7,876,869 B1* | 1/2011 | Gupta | ................... | H04B 1/109 |
| | | | | 375/350 |
| 8,995,292 B2* | 3/2015 | Wu | ..................... | H04W 16/14 |
| | | | | 370/252 |
| 9,520,180 B1* | 12/2016 | Mukhanov | .............. | A61K 8/20 |
| 2005/0232512 A1* | 10/2005 | Luk | .................... | G06K 9/6293 |
| | | | | 382/276 |
| 2009/0284644 A1* | 11/2009 | McKaughan | ........... | G01C 3/08 |
| | | | | 348/348 |
| 2011/0276180 A1* | 11/2011 | Seem | .................. | F25B 49/027 |
| | | | | 700/275 |
| 2014/0325999 A1* | 11/2014 | Hope | ...................... | F25B 9/14 |
| | | | | 62/6 |
| 2016/0050490 A1* | 2/2016 | Bruckman | ............ | G05D 19/02 |
| | | | | 381/97 |
| 2017/0146267 A1* | 5/2017 | Conrad | ................... | B22F 9/24 |

* cited by examiner

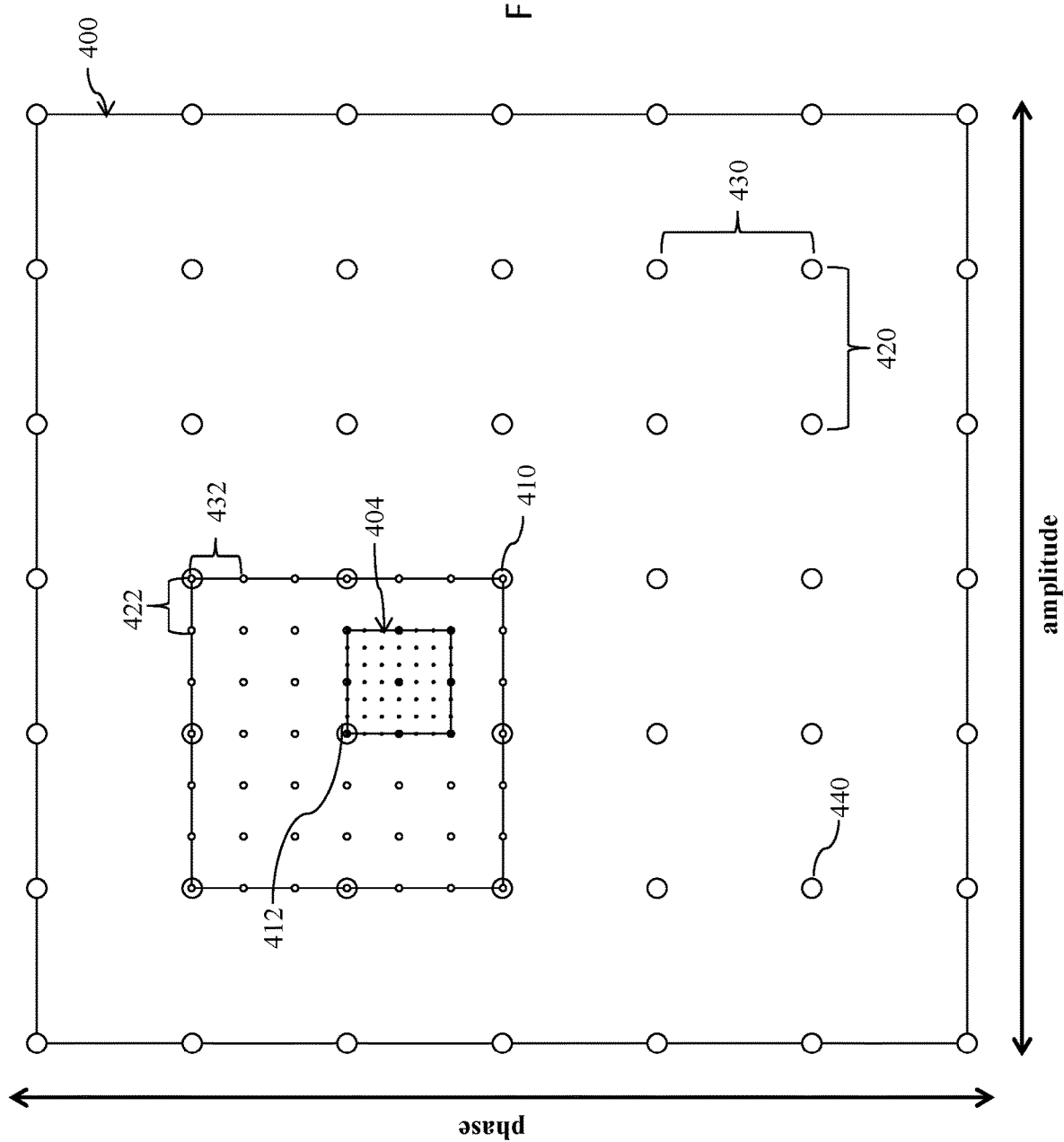

SYSTEMS AND METHODS FOR VIBRATION CONTROL

CROSS REFERENCE TO RELATED APPLICATIONS

This application claims the benefit of U.S. Provisional Application No. 62/521,206, filed on Jun. 16, 2017, the entire contents of which are hereby incorporated by reference.

FIELD OF THE INVENTION

The disclosed invention relates to vibration control systems and methods, and in particular, to vibration control systems and methods for cryocoolers utilized in satellites to cool imaging payloads for space imagery, in particular, infrared space imagery.

BACKGROUND OF THE INVENTION

Cryocoolers are commonly used to cool electronic components—such as imaging system payloads in satellites. Such cryocoolers, however, generate vibration that negatively impacts the image quality of such imaging systems by introducing what is known as "image jitter."

Vibration cancellation processing is traditionally performed by a digital signal processor ("DSP") device. But, DSPs are expensive and power hungry, which runs contrary to the needs of most space based imaging platforms.

In the present invention, control of the cryocooler and the vibration cancellation control processing is preferably performed by a single field programmable gate array ("FPGA"). This provides advantages in terms of lower costs and better radiation tolerance than DSP based designs, allowing use in deep space missions.

A shortcoming of FPGA based designs, however, is the lack of digital signal processing resources available in radiation hardened devices. To address this apparent mismatch, the present invention utilizes discrete Fourier transforms ("DFT") at the harmonics of the cryocooler motor drive as the basis of the signal processing. The present invention is thus FPGA friendly and minimizes the resources required while still providing the levels of vibration mitigation desired by platform integrators.

It is therefore desirable to provide these and other advantages over existing systems.

SUMMARY OF THE INVENTION

A system for vibration control of a cryocooler that cools an imager is provided. The system includes a vibration sensor that is physically affixed to the cryocooler. The vibration sensor senses a physical vibration of the cryocooler and to generates a vibration signal therefrom. The system also includes cryocooler drive electronics operatively coupled to the vibration sensor and the cryocooler. The cryocooler drive electronics output a drive waveform that drives the cryocooler so as to reduce the vibration impact of the cryocooler. The harmonic content of the cryocooler drive waveform is controlled by the cryocooler drive electronics based on the vibration signal.

Other features and advantages of the present invention will become apparent from the following more detailed description, taken in conjunction with the accompanying drawings, which illustrate, by way of example, the principles of the presently described embodiments.

BRIEF DESCRIPTION OF THE DRAWING(S)

FIG. 3 is a schematic representation of a phase-amplitude matrix according to at least one embodiment of the present invention;

DETAILED DESCRIPTION OF THE PREFERRED EMBODIMENTS

Figure 1:
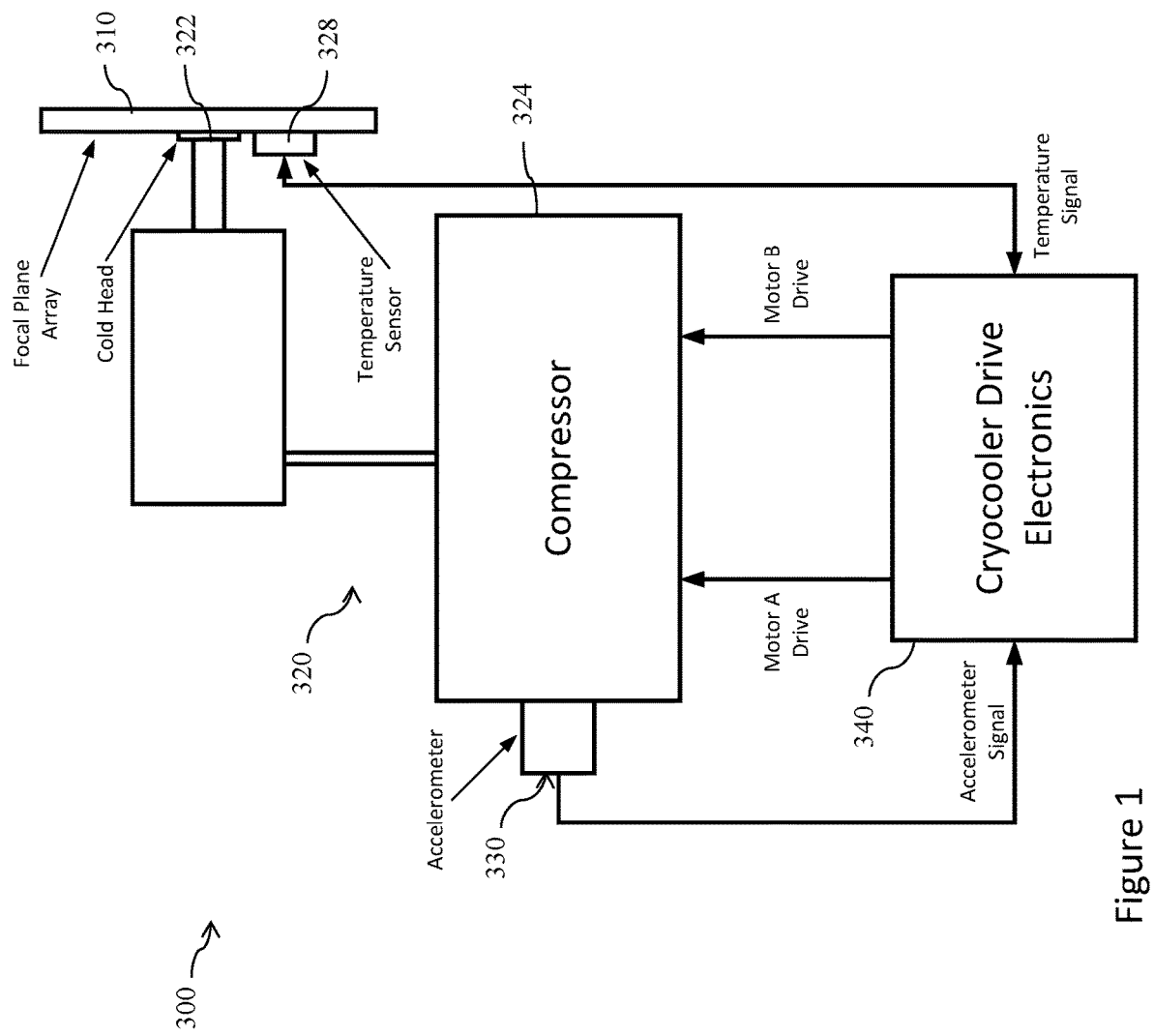
FIG. 1 is a schematic representation of an exemplary vibration control system according to at least one embodiment of the present invention.

The above described drawing figures illustrate the disclosed invention in at least one of its preferred, best mode embodiment, which is further defined in detail in the following description. Those having ordinary skill in the art may be able to make alterations and modifications to what is described herein without departing from its spirit and scope. While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspects of the invention to any embodiment illustrated. Therefore, it should be understood that what is illustrated is set forth only for the purposes of example and should not be taken as a limitation on the scope of the disclosed invention.

As shown in FIG. 1, a system 300 according to the present invention includes and imager 310, a cryocooler 320 configured to cool the imager, a vibration sensor 330, and cryocooler drive electronics 340 ("CDE").

The imager preferably corresponds to those imagers of satellite imaging systems. In at least one embodiment, the imager is a focal plane array ("FPA"). In at least one embodiment, the imager includes imaging electronics of a satellite imaging system, which imaging electronics may be cooled by the cryocooler. In at least one embodiment, the imaging electronics includes commercial infrared space imagery electronics.

The cryocooler preferably corresponds to cryocoolers configured to cool imagers of satellite imaging systems. In at least one embodiment, the cryocooler includes a cold head 322 and a compressor 324. The compressor may be, for example, a single piston compressor having an active balancing motor, or a dual piston compressor having dual motors. FIG. 1 illustrates the compressor having dual pistons/motors controlled by the CDE.

The vibration sensor is operatively coupled to the cryocooler and is communicatively coupled to the cryocooler driver electronics. The vibration sensor is preferably an accelerometer or a force transducer. In operation, the vibration sensor measures a physical vibration of the cryocooler and generates a vibration signal therefrom that represents the magnitude of physical vibration of the cryocooler. The vibration signal is communicated to the CDE to be processed.

In some embodiments, the vibration sensor is physically affixed to a body of the cryocooler. In other embodiments, the vibration sensor is physically affixed to a support structure of the cryocooler. Other locations may also be appropriate.

The CDE preferably comprise at least one appropriately configured controller. In some embodiments, the CDE comprises at least one FPGA. In at least one embodiment, a the CDE comprises a single FPGA. In at least one embodiment, all vibration cancellation control processes are conducted via the CDE.

The CDE is operatively coupled the cryocooler so as to operate the cryocooler to cool the imager in accordance with a temperature control process. Accordingly, a temperature sensor 328 may be operatively coupled to the imager so as to sense the temperature thereof in accordance with a temperature control loop controlled by the CDE.

In operation, the CDE is configured to output a drive waveform to drive the cryocooler, in particular the cryocooler compressor. The CDE is also configured to adjust the drive of: the active balancing motor or at least one of the dual motors of the compressor. The CDE is further configured to reduce the vibration impact of the cryocooler via modification of the harmonic content of the cryocooler drive waveform in accordance with the control process described herein.

The CDE preferably receives the vibration signal from the vibration sensor as an analog signal, amplifies and filters the vibration signal, and converts the vibration signal to a digital signal. The CDE may accordingly include amplifier circuitry, filtering circuitry, and/or analog-to-digital conversion circuitry. It will be understood that such circuity may be separate from the CDE, or integral thereto. In some embodiments, the amplification and filtering of the vibration signal is such that a vibration content of the signal is maximized while a noise content of the signal is minimized prior to analog-to-digital conversion.

The digitized vibration signal is processed by the CDE so as to determine the magnitude of the vibration content at each of a specified maximum number of harmonic components, i.e., harmonic number. In processing the vibration signal, the CDE utilizes discrete Fourier transforms ("DFT") to determine the magnitude of the vibration content according to the harmonic number. The CDE is accordingly configured to DFT the vibration signal according to the specified harmonic number.

The specified maximum number of harmonics is preferably selectable by a user up to a capacity built into the CDE. Accordingly, the system may include a user interface facilitating user control of the CDE in this and other aspects described herein. The user interface may facilitate the selection of consecutive harmonics, or of any arbitrary set of harmonics.

It will be understood that the harmonics capacity of the FPGA is determined by how many gates are available and how fast the vibration signal is being sampled by the sensor. The Nyquist limit will establish a maximum possible number of harmonics for a given sampling rate. One design consideration is that more harmonics means more gates, which, necessarily increases the power consumed by the FPGA.

In at least one embodiment, DFT is performed according to the fundamental (i.e., first), second and third harmonics. However, it will be understood that additional harmonics may be accounted for as processing constraints and resources allow. DFT is preferably performed up to the fifth harmonic. Higher order harmonics are expressly contemplated.

The use of DFT techniques provide advantages in that they are much less computationally and memory intensive when performed one at a time than an equivalent fast Fourier transform ("FFT") techniques. This permits implementation within the constraints of a modestly sized FPGA. The utilization of DFT minimizes the number of gates required in a CDE of FPGA design. The DFT techniques are preferably performed on only one harmonic at a time, so as to reduce the computational load.

Figure 2:
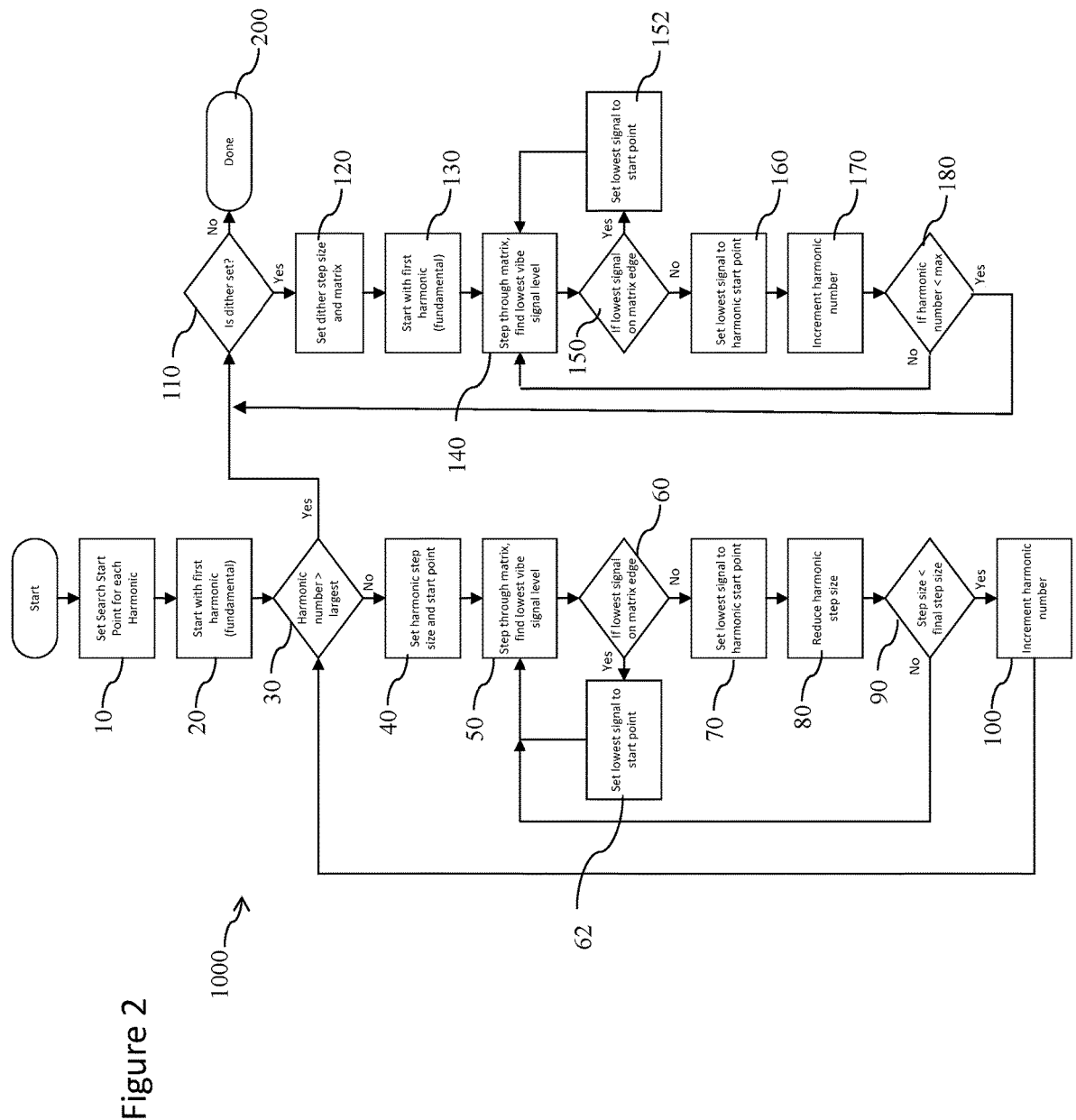
FIG. 2 is a flow-chart of an exemplary method according to at least one embodiment of the present invention.

An exemplary control process 1000 executed by the CDE utilizing DFT will now be described with reference to FIGS. 2 and 3.

At step 10, a search start point is set for each harmonic. As is explained herein, the search start point is a neutral point that is 100% of the fundamental harmonic amplitude with 0° phase offset and 0% amplitude offset for each of the higher harmonics. In other words, this is a no-correction position.

At step 20, the process initially proceeds with a fundamental harmonic (i.e., harmonic number of one) as a current harmonic. It should be noted that while the process is described herein as beginning with the fundamental harmonic, it may begin with other harmonics, as desired.

At step 30, it is checked whether the current harmonic is greater than the specified maximum harmonic. If yes, the process continues to step 110. If no, the process continues to step 40.

At step 40, an initial start point 410, amplitude step size 420 and phase step size 430 are set. The initial start point corresponds to the search start point. The initial amplitude and phase step sizes are preferably settable by the user via the user interface. The step sizes are preferably set in accordance with the characteristics of the imaging system and/or cryocooler.

At step 50, a phase-amplitude matrix 400 is generated for the current harmonic based on the start point, the amplitude step size, and the phase step size. The phase-amplitude matrix consists of a plurality of phase-amplitude points 440. Each phase-amplitude point corresponds to a phase-amplitude measurement indicated by the received vibration signal. An exemplary phase-amplitude matrix is illustrated for example in FIG. 3.

The phase-amplitude measurements correspond to adjustments, preferably small adjustments, centered around the start point. The start point initially corresponds to a zero-phase adjustment and a zero-amplitude adjustment of the phase-amplitude matrix.

From the start point, additional points are determined based on the amplitude step size and the phase step size. The amplitude step size and the phase step size are preferably preset. In addition, predetermined minimum step sizes are also preferably preset.

As shown in FIG. 3, the phase-amplitude matrix preferably consists of forty-nine phase-amplitude points. It will be appreciated that while the forty-nine phase-amplitude point matrix is preferable, other matrix sizes may be used without departing from the scope of the invention.

Also at step 50, a lowest vibration signal level is determined based on sampling the phase-amplitude matrix. FIG. 3 illustrates point 412 as having been determined to correspond to the lowest vibration signal level.

In particular, DFT is performed on the vibration signal corresponding to each of the phase-amplitude points according to the current harmonic number. The result of the DFT is an amplitude at the current harmonic for the vibration signal corresponding to the phase-amplitude point. Of the resultant amplitudes, the lowest vibration signal level (i.e., the smallest determined amplitude) is determined.

At step 60, it is determined whether the phase-amplitude point corresponding to the lowest vibration signal level is on the edge of the phase-amplitude matrix. If yes, the process proceeds to step 62. If no, the process proceeds to step 70. At step 62, the phase-amplitude point corresponding to the lowest vibration signal level is set as the start point, and the process continues to step 50. It should be noted that steps 60-62 are optional.

At step 70, the determined phase-amplitude point corresponding to the lowest vibration signal is set as the start point, and the process continues to step 80, at which point the amplitude step size and the phase step size are set to reduced values.

At step 90, it is determined whether the reduced step size is less than a minimum step size. If yes, the process continues to step 100. If no, the process continues to step 50—at which point the process is iterative with reduced step sizes and adjusted start points.

In other words, after the DFT has been determined for each phase-amplitude point in the phase-amplitude matrix, the point having the smallest amplitude is identified, and a smaller phase-amplitude grid (i.e., one with smaller step sizes) is generated around that point, and so on until the predetermined minimum step sizes are reached. FIG. 3 schematically illustrates this iterative process.

At step 100, the harmonic number is increased and the process continues to step 30. Accordingly, the control process is iterative for each harmonic.

At step 110, it is determined whether a dithering option is set by the user via the user interface. If no, the process concludes at step 200. If yes, the process continues to step 120—which begins a dithering routine.

At step 120, a dithering step size is set. The dithering step size is preferably preset.

At step 130, an initial harmonic for the dithering routine is set. The initial harmonic is preferably the fundamental harmonic.

At step 140, a dither phase-amplitude matrix 404 is generated for the current harmonic based on a dithering start point 412 corresponding to the start point of the final iteration of steps 30 through 100, and the dithering step size. The dither phase-amplitude matrix is preferably a nine-point matrix. Also at step 140, a lowest vibration signal level is determined based on the dither phase-amplitude matrix.

In particular, DFT is performed on the vibration signal corresponding to each of the phase-amplitude points according to the current harmonic number. The result of the DFT is an amplitude at the current harmonic for the vibration signal corresponding to the phase-amplitude point. Of the resultant amplitudes, the lowest vibration signal level (i.e., the smallest determined amplitude) is determined.

At step 150, it is determined whether the phase-amplitude point corresponding to the lowest vibration signal level is on the edge of the dither phase-amplitude matrix. If yes, the process proceeds to step 152. If no, the process proceeds to step 160.

At step 152, the phase-amplitude point corresponding to the lowest vibration signal level is set as the dithering start point, and the process continues to step 140. It should be noted that steps 150-152 are optional.

At step 160, the phase-amplitude point corresponding to the lowest vibration signal level is set as the dithering start point, and the process continues to step 170—at which point the current harmonic number is increased.

At step 180, it is checked whether the current harmonic is greater than the specified maximum harmonic. If yes, the process continues to step 110—at which point the dithering process continues so as to continuously adjust for small changes in the vibration. If no, the process continues to step 140.

It will be understood that the lowest vibration value selected at the end of each cycle—and occurs at each selected harmonic. In other words, as the control process 'walks' through the phase-amplitude points within each progressively smaller phase-amplitude matrix, the CDE is controlling the drive waveform according to the adjustments corresponding to each phase-amplitude point so as to determine the point of lowest vibration. When the lowest point is determined for a given harmonic, the drive waveform at that harmonic is maintained. In practice, as environmental conditions (e.g., temperature, resistance, etc.) change, the lowest vibration point may also change in small ways. Accordingly, the optional dither control process may track small changes to where in the phase-amplitude matrix the lowest vibration point may be located.

While described herein as treating each harmonic successively, it will be understood that the present invention may be treated in parallel, or otherwise. In particular, the control process may determine the respective phase-amplitude matrices for each harmonic, then the respective finer phase-amplitude matrices for each harmonic, and so on until the finest phase-amplitude matrices are determined for reach harmonic.

In some embodiments, the controller is configured to operate according to several operation modes, including: fully automatic, harmonic selectable autonomy, purely external (i.e., manual), and combinations thereof. In the fully automatic mode, the harmonics are minimized autonomously. In the harmonic selectable autonomy mode, individual harmonics are selectable to be minimized autonomously. In the purely external mode, the control parameters for each harmonic are uploaded by a user.

In some embodiments, the above described control architecture is executed wholly or partially within FPGA firmware. Thus, there is no need for additional processors and/or peripheral components—which permits eliminating expensive radiation hard microprocessors, digital signal processors and SRAM components. Moreover, significant attenuation of additional harmonic vibrations may be accomplished with only very minor impact on unit cost.

The embodiments described in detail above are considered novel over the prior art of record and are considered critical to the operation of at least one aspect of the invention and to the achievement of the objectives of the invention. The words used in this specification to describe the exemplary embodiments are to be understood not only in the sense of their commonly defined meanings, but also to include any special definition with regard to structure, material or acts that would be understood by one of ordinary skilled in the art to apply in the context of the entire disclosure.

The definitions of the words or drawing elements described herein are meant to include not only the combination of elements which are literally set forth, but all equivalent structures, materials or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim without departing from the scope of the invention.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

Furthermore, the functionalities described herein may be implemented via hardware, software, firmware or any combination thereof, unless expressly indicated otherwise. If implemented in software, the functionalities may be stored in a memory as one or more instructions on a non-transitory computer readable medium, including any available media accessible by a computer that can be used to store desired program code in the form of instructions, data structures or the like. Thus, certain aspects may comprise a computer program product for performing the operations presented herein, such computer program product comprising a non-transitory computer readable medium having instructions stored thereon, the instructions being executable by one or more processors to perform the operations described herein. It will be appreciated that software or instructions may also be transmitted over a transmission medium, as is known in the art. Further, software and/or hardware modules and/or other appropriate means for performing the operations described herein may be utilized in implementing the functionalities described herein.

The scope of this description is to be interpreted in conjunction with the appended claims.

What is claimed is:

1. A system for vibration control, the system comprising:
    a cryocooler configured to cool an imager based on a drive waveform,
    a vibration sensor physically affixed to the cryocooler, the vibration sensor configured to sense a physical vibration of the cryocooler and to generate a vibration signal therefrom, and
    cryocooler drive electronics operatively coupled to the vibration sensor and the cryocooler, the cryocooler drive electronics configured to output the drive waveform to drive the cryocooler so as to reduce the vibration impact of the cryocooler, wherein the harmonic content of the cryocooler drive waveform is controlled based on the vibration signal, and wherein the cryocooler drive electronics includes a single field-programmable-gate array configured to determine the drive waveform by executing the following sequence entirely within the field-programmable-gate array:
    (a) set a start point for each harmonic to a neutral point,
    (b) for a current harmonic, generate a phase-amplitude matrix based on an initial start point, an amplitude step size and a phase step size, wherein the phase-amplitude matrix consists of a plurality of phase-amplitude points, each corresponding to a phase-amplitude measurement indicated by the vibration signal,
    (c) determine which of the phase-amplitude points has the lowest vibration signal level based on sampling the phase-amplitude matrix from the start point,
    (d) set the start point for the current harmonic to the phase-amplitude points having the lowest vibration signal level,
    (e) reduce the amplitude step size and the phase step size,
    (f) increase the current harmonic number and return to (b) until the current harmonic is greater than a specified maximum harmonic, and
    (g) execute a dithering routine having a preset dithering step size.

2. The system of claim 1, wherein the imager is a focal plane array imager.

3. The system of claim 1, wherein the cryocooler is configured to cool electronics associated with the imager.

4. The system of claim 1, wherein the cryocooler includes a cold head and a compressor.

5. The system of claim 1, wherein the cryocooler includes a compressor, and the drive waveform drives the compressor.

6. The system of claim 1, wherein the cryocooler drive electronics are configured to discrete Fourier transform the vibration signal according to a specified harmonic number.

7. The system of claim 1, wherein the cryocooler drive electronics are configured to operate the cryocooler to cool the imager in accordance with a temperature control process.

* * * * *